(12) United States Patent
Codol

(10) Patent No.: US 11,054,528 B2
(45) Date of Patent: Jul. 6, 2021

(54) DEVICE AND METHOD FOR POSITIONING AN UNDERWATER DEVICE

(71) Applicant: Submarine Open Technologies, Lattes (FR)

(72) Inventor: Jean-Marie Codol, Ales (FR)

(73) Assignee: Submarine Open Technologies, Lattes (FR)

( * ) Notice: Subject to any disclaimer, the term of this patent is extended or adjusted under 35 U.S.C. 154(b) by 236 days.

(21) Appl. No.: 16/308,465

(22) PCT Filed: Jun. 9, 2017

(86) PCT No.: PCT/FR2017/051458
§ 371 (c)(1),
(2) Date: Dec. 9, 2018

(87) PCT Pub. No.: WO2017/212182
PCT Pub. Date: Dec. 14, 2017

(65) Prior Publication Data
US 2019/0271785 A1    Sep. 5, 2019

(30) Foreign Application Priority Data
Jun. 9, 2016 (FR) ...................................... 1655306

(51) Int. Cl.
*G01S 19/45* (2010.01)
*B63C 11/26* (2006.01)
(Continued)

(52) U.S. Cl.
CPC .............. *G01S 19/45* (2013.01); *B63C 11/26* (2013.01); *B63C 11/48* (2013.01); *G01S 5/0009* (2013.01);
(Continued)

(58) Field of Classification Search
CPC ........ G01S 5/30; G01S 5/0009; G01S 5/0072; G01S 19/39; G01S 19/45; G01S 5/072; B63C 11/26; B63C 11/48
See application file for complete search history.

(56) References Cited

U.S. PATENT DOCUMENTS

| 5,119,341 A * | 6/1992 | Youngberg | ........... G01S 5/0009 367/5 |
| 5,331,602 A * | 7/1994 | McLaren | .............. G01S 5/0009 367/127 |
| 2009/0196122 A1 * | 8/2009 | Crowell | ................. H04B 11/00 367/127 |

FOREIGN PATENT DOCUMENTS

| FR | 2 785 993 A1 | 5/2000 |
| WO | 94/14081 A1 | 6/1994 |

OTHER PUBLICATIONS

ISR; European Patent Office; NL; dated Aug. 16, 2017.

* cited by examiner

*Primary Examiner* — Dao L Phan
(74) *Attorney, Agent, or Firm* — Patshegen IP LLC; Moshe Pinchas

(57) ABSTRACT

The system for positioning an underwater device including at least two surface transponders comprising a receiver for receiving radio signals transmitted by a geolocation system;
each surface transponder comprising:
an estimator for estimating at least one radio pseudo-distance;
an attachment to a float; and
a communicator for communicating information representative of the radio pseudo-distances; and
an underwater acoustic transmitter;
the underwater device comprising:
(Continued)

a receiver for receiving information representative of the radio pseudo-distances;

an acoustic signal receiver;

a determinator for determining one or more acoustic pseudo-distances between at least two underwater acoustic transmitters and the underwater device; and a calculator for calculating the position of the device in a terrestrial frame of reference centered on one of the surface transponders.

16 Claims, 2 Drawing Sheets

(51) Int. Cl.
*B63C 11/48* (2006.01)
*G01S 5/00* (2006.01)
*G01S 5/30* (2006.01)
*B63C 11/02* (2006.01)

(52) U.S. Cl.
CPC .............. *G01S 5/0072* (2013.01); *G01S 5/30* (2013.01); *B63C 2011/021* (2013.01)

ced by a receiver on Earth, this receiver determining its position in the reference frame of the satellites by calculating the distances separating it from each satellite. Since the position of the satellites is also known, it is possible to determine the position of the receiver in the terrestrial reference frame.

DEVICE AND METHOD FOR POSITIONING AN UNDERWATER DEVICE

TECHNICAL FIELD OF THE INVENTION

The present invention relates to a device and method for positioning an underwater device. It applies, in particular, to the location of divers or drones below the surface of the sea.

STATE OF THE ART

Determining the position of divers in a body of fresh or sea water is a technical challenge because of the obstacles these environments present for the transmission of electromagnetic waves.

The consequences of this positioning problem can be the loss of a diver who has strayed away from a group of divers or from the transport craft of the diver or divers. In addition, the diver must be able to reach a dive site as quickly as possible, which entails indicating the position of this site to the diver.

The principal of the GPS (for "Global Positioning System") is known, in which a plurality of satellites transmit electromagnetic signals captured by a receiver on Earth, this receiver determining its position in the reference frame of the satellites by calculating the distances separating it from each satellite. Since the position of the satellites is also known, it is possible to determine the position of the receiver in the terrestrial reference frame.

However, in practice, transmitting the signals sent by the satellites through the ionosphere leads to the signals being distorted, resulting in a position error that can be as high as approximately ten meters.

To compensate for this effect, the so-called differential GPS systems utilize a ground-based reference receiver station which, like the receiver, calculates the distances to each satellite. These calculated distances are then transmitted to the receiver, which calculates its position relative to the reference receiver station, thus overcoming the impact of the ionospheric delay. The position error is therefore of the order of one meter.

In the field of locating underwater devices, systems are known that utilize a plurality of buoys equipped with a GPS position sensor and a transmitter of underwater acoustic signals transmitting the position calculated by that buoy.

However, in these systems, each buoy has a position error of the order of ten meters and transmits this error to the underwater device with an additional error due to the transmission of underwater signals. As a result, the accuracy of the position determined with these systems is low.

More advanced systems are known that utilize the differential GPS operating principle, in which one of the buoys is considered to be a reference receiver station. Nevertheless, these systems need air-based radio linking the buoys so that the reference buoy can transmit its position to the other buoys. In addition, the reference buoy must be chosen before the start of the process, and the number of surface buoys makes the architecture of the system more complex.

In other current systems, such as those described in U.S. Pat. No. 8,654,610:

- a float positioned at the surface of the body of water determines the position based on a radio-frequency signal received,
- this float is connected to a network of transmitters positioned on a rigid structure immersed in the body of water, each transmitter transmitting by sound signals the position information of the float according to a shared clock,
- a receiver of the transmitted sound signals determines its position based on the position information transmitted by each transmitter and measures a time shift of each, identical, signal received.

These systems have several drawbacks:

- transporting a rigid structure on the craft reduces the space on board,
- transmitting position information involves the long-term transmission of messages that are lengthy and therefore likely to be incorrect or not reach the receiver,
- there is often only one float, which results in a limited line of sight, reducing the position accuracy,
- when the system comprises several floats, these floats have a relative position accuracy for each float of the order of one meter, which reduces the overall accuracy of the system.

SUBJECT OF THE INVENTION

The present invention aims to remedy all or part of these drawbacks.

To this end, according to a first aspect, the present invention envisages a system for positioning an underwater device, which comprises:

- at least two surface transponders, each surface transponder comprising a receiver of radio signals transmitted by at least two satellite sources of signals of a geolocation system,
- each surface transponder comprising:
  - a means for estimating at least one radio pseudo-distance between the surface transponder and at least two sources of signals from the geolocation system,
  - an attachment to a float configured to have neutral buoyancy at a specific depth, and
  - a means for communicating information representative of the radio pseudo-distances to the underwater device, and
  - an underwater acoustic transmitter synchronized to the time of the geolocation system configured to transmit an acoustic signal to the underwater device,
- the underwater device comprising:
  - a means for receiving information representative of the radio pseudo-distances transmitted by at least two surface transponders,
  - an acoustic signal receiver configured to receive the acoustic signals transmitted by at least two surface transponders,
  - a means for determining one or more acoustic pseudo-distances between at least two underwater acoustic transmitters and the underwater device, and
  - a means for calculating the position of the device in a terrestrial frame of reference centered on one of the surface transponders, the means for calculating the position comprising a computing unit executing a probabilistic estimation process performing this estimation by means of at least the following measurements:
    - a selection of information representative of the radio pseudo-distances received by the reception means,
    - a selection of acoustic pseudo-distances determined by the determination means.

Thanks to these provisions, no reference buoy is necessary, and the system's architecture is not made more complex with the addition of the surface transponder. In this system, the position of the transponders is calculated directly at the underwater device, which makes it possible to eliminate the position errors due to ionospheric effects.

In some embodiments, at least one underwater acoustic transmitter is synchronized to an internal clock of the radio receiver of the geolocation system.

These embodiments make it possible to reproduce the Doppler effect of the satellite signals in the case of GPS. The Doppler effect makes the frequency of the signals vary randomly, according to the movement of the satellites. Altering the acoustic source as a function of the internal clock of the GPS receiver makes it possible to operate the location system with frequencies considered identical but altered randomly by the dynamic means of the internal clock of the GPS receiver.

In some embodiments, the acoustic transmitter and the communication means are one and the same, the acoustic transmitter communicating information representative of the radio pseudo-distances to the underwater device.

These embodiments make it possible to limit the number of means utilized to produce the system.

In some embodiments, the receiver and the receiving means of an underwater device are one and the same, the receiver receiving information representative of the radio pseudo-distances transmitted by at least two surface transponders.

In some embodiments:
  each transmitter of a surface transponder acoustically transmits a linear combination of several periodic signals over several channels, with one channel for one pseudo-distance to be transmitted, each channel being either a clock signal over time from the geolocation system or the representation of one of the radio pseudo-distances whose information is to be transmitted, each periodic signal being time-shifted as a function of the value of the radio pseudo-distance radio to be transmitted, and
  the acoustic receiver reconstitutes the information representative of the radio pseudo-distances, by comparing the arrival times of the different acoustic signals over the different acoustic channels.

These embodiments make it possible to transmit the pseudo-distance information without this information being binarized. The transmission of information is performed by the adaptation of a transmission parameter.

In some embodiments, at least one surface transponder comprises at least two underwater acoustic transmitters.

These embodiments enable the system to operate with a single transponder.

In some embodiments, the system that is the subject of the present invention comprises a structure for attaching the at least two said underwater acoustic transmitters, the surface transponder comprising a means for determining the position of these underwater acoustic transmitters in the terrestrial frame relative to the receiver of signals transmitted by the satellite sources, and a calculation means implementing the following operations:
  a measurement of theoretical radio pseudo-distances simulating an identical position of the radio receiver and underwater acoustic transmitters, and
  a transmission for commanding the transmission of the theoretical measurements of radio pseudo-distance values, by each transmitter.

These embodiments enable the system to operate with a single transponder.

In some embodiments, at least one surface transponder comprises a means for determining a position relative to the geolocation system, the transmitter transmitting an item of information representative of the determined position to the underwater device, the calculation means of the underwater device being configured to calculate a position relative to the frame of reference of the geolocation system.

In some embodiments, the system that is the subject of the present invention comprises at least two underwater devices.

In some embodiments, at least one surface transponder comprises a communication means configured to receive, from at least one underwater device, known as "principal", the position of one or more underwater devices, and to retransmit this information representative of the position of one or more underwater devices to at least one second underwater device, the so-called "principal" underwater devices being configured to transmit an item of information representative of the position of at least one underwater device to at least one surface transponder.

In some embodiments, at least one surface transponder comprises a means for communicating an item of information representative of the calculated position to at least a second so-called "principal" underwater device.

In some embodiments, at least one underwater device comprises a means for displaying an item of position information of at least one underwater device.

In some embodiments, the system that is the subject of the present invention comprises a means, positioned above the surface, for displaying an item of information relative of the position of one or more underwater devices.

In some embodiments, at least one underwater device comprises at least one additional sensor amongst:
  a depth sensor;
  an inertial measurement unit; and
  a magnetometer,
the means for calculating the position of the device comprising a computing unit executing a probabilistic estimation process performing this estimation by means of at least the following measurements:
  a selection of information representative of the radio pseudo-distances received by the reception means,
  a selection of acoustic pseudo-distances determined by the determination means, and
  a selection of measurements from at least one said additional sensor.

In some embodiments, at least one device is embedded in a bracelet.

According to a second aspect, the present invention envisages a method of positioning an underwater device, characterized in that it comprises:
  a step of receiving, by at least two surface transponders, radio signals transmitted by at least two satellite sources of signals of a geolocation system,
  a step of estimating at least one radio pseudo-distance between the surface transponder and at least two sources of signals from the geolocation system,
  a step of attaching a transponder to a float configured to have neutral buoyancy at a specific depth, and
  a step of communicating, by a transponder, of information representative of the radio pseudo-distances to the underwater device,
  a step of underwater acoustic transmission, by a transponder, synchronized to the time of the geolocation system configured to transmit an acoustic signal to the underwater device,
  a step of receiving information, by a reception means of the underwater device, representative of the radio pseudo-distances transmitted by at least two surface transponders, a step of receiving, by a receiver of the underwater device, acoustic signals representative of the radio pseudo-distances transmitted by at least two surface transponders, a step of determining one or more acoustic pseudo-distances between at least two underwater acoustic transmitters of surface transponders and the underwater device, and a step of calculating the position of the device in a terrestrial frame of reference centered on one of the surface transponders, the means for calculating the position comprising a computing unit executing a probabilistic estimation process performing this estimation by means of at least the following measurements:

a selection of information representative of the radio pseudo-distances received by the reception means, a selection of acoustic pseudo-distances determined by the determination means.

As the particular aims, advantages and features of the method that is the subject of the present invention are similar to those of the device that is the subject of the present invention, they are not repeated here.

BRIEF DESCRIPTION OF THE FIGURES

Other advantages, aims and particular features of the invention will become apparent from the non-limiting description that follows of at least one particular embodiment of the system and method that are the subjects of the present invention, with reference to drawings included in an appendix, wherein.

DESCRIPTION OF EXAMPLES OF REALIZATION OF THE INVENTION

The present description is given in a non-limiting way, each characteristic of an embodiment being able to be combined with any other characteristic of any other embodiment in an advantageous way.

It is now noted that the figures are not to scale.

Figure 1:
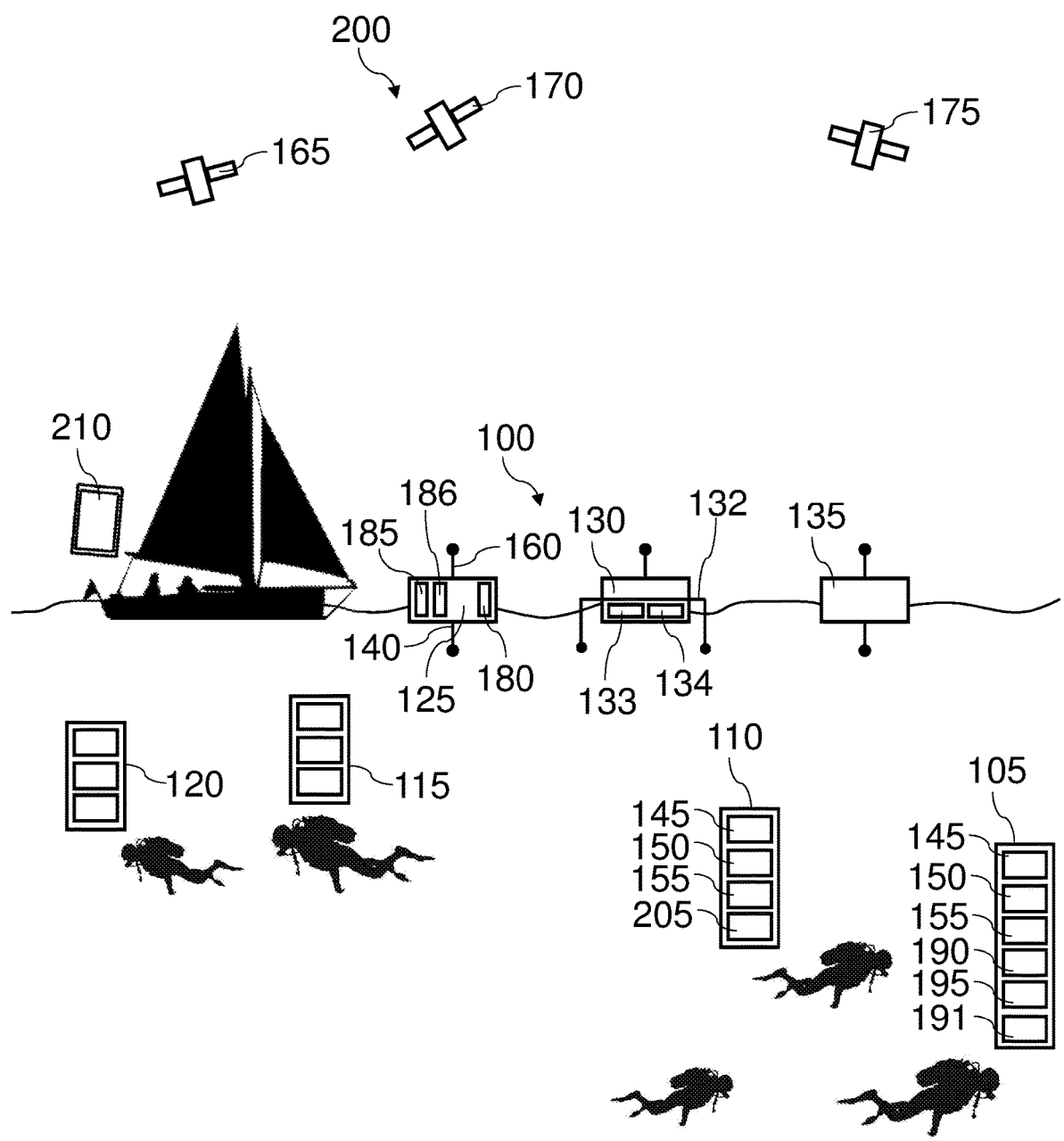
FIG. 1 represents, schematically, a first particular embodiment of the device that is the subject of the present invention.

FIG. 1, which is not to scale, shows a schematic view of an embodiment of the system 100 that is the subject of the present invention. This system 100 for positioning an underwater device, 105, 110, 115 and/or 120, comprises:

at least two surface transponders, 125, 130 and/or 135, each surface transponder comprising a receiver 160 of radio signals transmitted by at least two satellite sources, 165, 170 and/or 175, of signals of a geolocation system 200, each surface transponder comprising:

a means 180 for estimating at least one radio pseudo-distance between the surface transponder and at least two sources of signals from the geolocation system, an attachment 185 to a float configured to have neutral buoyancy at a specific depth, and a means 140 for communicating information representative of the radio pseudo-distances to the underwater device, and an underwater acoustic transmitter 140 synchronized to the time of the geolocation system configured to transmit an acoustic signal to the underwater device, the underwater device comprising:

a means 145 for receiving information representative of the radio pseudo-distances transmitted by at least two surface transponders, an acoustic signal receiver 145 configured to receive the acoustic signals transmitted by at least two surface transponders, a means 150 for determining one or more acoustic pseudo-distances between at least two underwater acoustic transmitters and the underwater device, and a means 155 for calculating the position of the device in a terrestrial frame of reference centered on one of the surface transponders, the means for calculating the position comprising a computing unit executing a probabilistic estimation process performing this estimation by means of at least the following measurements:

a selection of information representative of the radio pseudo-distances received by the reception means, a selection of acoustic pseudo-distances determined by the determination means.

Each transponder, 125, 130 and 135, is, for example, an electronic circuit mounted on a buoy or attached to a floating structure or to a craft.

The attachment 185 can be any type known to the person skilled in the art such as, for example, an attachment by nailing, screwing, clipping or tying.

Each signal receiver 160 is, for example, an antenna configured to receive electromagnetic signals transmitted by each satellite source, 165, 170 and 175, of the geolocation system 200.

This geolocation system 200 is, for example, the GPS system.

The estimation means 180 is, for example, an electronic calculation circuit configured to calculate a pseudo-distance between the transponder, 125, 130 or 135, and each source, 165, 170 and/or 175, whose signal has been received by the receiver 160.

To estimate each pseudo-distance, the estimation means 180:

calculates the time difference between the signal transmitted by a source, 165, 170 or 175, and a local replication of the same signal, reconstituted in synchronization with the local clock in the transponder, 125, 130 or 135, calculates the pseudo-distance by multiplying a wave propagation speed constant, such as the value of the speed of light in a vacuum, for example, by the time difference between the signal received and the local replication.

The clocks of each transponder, 125, 130, 135, are independent. But it is possible to generate, from the estimator of radio pseudo-distances, a clock synchronized with the geolocation system 200.

The communication means 140 is, for example, an antenna configured to transmit electromagnetic signals to at least one underwater device, 105, 110, 115 and/or 120.

However, because of the propagation constraints in an underwater environment, this communication means 140 is preferably an electroacoustic transducer configured to transmit acoustic signals representative of electrical signals.

Therefore, as is understood, in this embodiment, the communication means 140 does not communicate a known position of the transponder, 125, 130 or 135, to the underwater device, 105, 110, 115 or 120, but only the pseudo-distances determined.

The transmitter 140 is, for example, an electroacoustic transducer configured to transmit acoustic signals representative of electrical signals.

These signals are, for example, representative of directions in a three-dimensional space of each satellite, and possibly the position of a craft.

In some embodiments, at least one underwater acoustic transmitter 140, 105, 110, 115 and/or 120, is synchronized to an internal clock of the radio receiver 160 of the geolocation system 200.

In some preferred variants, the transmitter 140 and the communication means 140 are one and the same.

Each underwater device, 105, 110, 115 and 120, comprises a means 145 for receiving information representative of the radio pseudo-distances transmitted by at least two surface transponders, 125, 130 and/or 135.

This reception means 145 is, for example, an electroacoustic transducer configured to transform acoustic signals into electrical signals. These acoustic signals are representative of a pseudo-distance estimated by the transponder, 125, 130 or 135, having transmitted the corresponding acoustic signals.

Each underwater device, 105, 110, 115 and 120, comprises an acoustic signal receiver 145 configured to receive the acoustic signals transmitted by at least two surface transponders, 125, 130 and/or 135.

The receiver 145 is, for example, an antenna configured to receive electromagnetic signals transmitted by a transmitter 140.

Whatever the technology, norm or standard utilized by the transmitter 140, the receiver 145 utilizes the same technology, norm or standard in a complementary manner.

In some variants, the transmitter 140 and the receiver 145 are connected by a flexible electric cable or by infrared wave transmission.

In some preferred variants, the receiver 145 is an electroacoustic transducer configured to transform acoustic signals into electrical signals.

In some preferred variants, the receiver 145 and the reception means 145 are one and the same.

In some variants, communication between an underwater device, 105, 110, 115 and/or 120, with a surface transponder, 125, 130 and/or 135, is bidirectional.

The determination means 150 is, for example, an electronic calculation circuit operating in the same way as the estimation means 180 of each transponder, 125, 130 and 135.

To estimate each pseudo-distance, the determination means 150:
- calculates the time difference between the signal transmitted by a source 125, 130 or 135, and a local replication of the same signal, reconstituted in synchronization with the local clock at the underwater device, 105, 110, 115 or 120,
- calculates the pseudo-distance by multiplying a wave propagation speed constant, such as the value of the speed of sound in sea-water, for example, by the time difference between the signal received and the local replication.

The clocks of each underwater device, 105, 110, 115 or 120, are for example synchronized to the clock of the transponders, 125, 130 and 135, preferably synchronized to the clock of the geolocation system 200.

The calculation means 155 of each underwater device, 105, 110, 115 and 120, is, for example, an electronic calculation circuit configured to:
- calculate, by trilateration, the position of the underwater device, 105, 110, 115 or 120, relative to each transponder, 125, 130 and/or 135, for which a pseudo-distance has been determined by the determination means 150,
- calculate, by trilateration, the position of each transponder, 125, 130 and/or 135, for which a pseudo-distance has been determined by the determination means 150, relative to the sources, 165, 170 and/or 175, of the geolocation system 200,
- calculate, by transitivity, the position of the underwater device, 105, 110, 115 or 120, relative to the satellite sources, 165, 170 and/or 175, of the geolocation system 200.

The probabilistic estimation process is executed on the means 155 for calculating the position of the device. The process performs, for example, the following operations:
- the progressive construction of a state vector, each element of the state vector being a one- or multi-dimensional numerical variable having a numerical value. The following variables can be cited: at each instant a new 3D position of the underwater device, 105, 110, 115 or 120, executing the probabilistic estimation relative to the satellite sources, 165, 170 and/or 175, of the geolocation system 200, the clock differences, in seconds, between each radio receiver of the system 200 and the underwater device, the clock differences, in seconds, between each radio receiver of the system 200 and the satellite sources, 165, 170 and/or 175;
- the progressive construction of the measurement vector. Each measurement is a random variable coming from a measurement process. The measurements of acoustic and radio pseudo-distances can be mentioned, and also the measurements of depth, acceleration or ambient magnetism, for example.
- the progressive construction of the measurement residual vector. Each measurement residual is a function of a measurement of the measurement vector with the state vector. The residual is characterized in that its numerical value (one- or multi-dimensional, with a dimension identical to or different from the measurement in question) is equal to zero in the case of a measurement considered to be without errors, and whose value increases when this error considered mounts.
- lastly, a regular process of updating the state vector. The objective of this process is to re-evaluate said state vector by exploring new values and then, as a consequence, to re-evaluate the measurement residual vector with the aim of reducing as much as possible a certain norm of the measurement residual vector. There are several methods, referred to as probabilistic, for achieving this. They are called probabilistic in that the probability theory makes it possible to give a direction and a value from the iterative updating of the state vector. One can cite the methods based on pseudo-inverses, based on so-called "OR" decomposition, Cholesky decomposition, or the methods of semi-random explorations, known as Monte-Carlo, or the methods based on the evolution theories from the field of genetics.
- optionally, one can add a process of eliminating state and measurement values whose effects are considered undesirable in the overall process.

The probabilistic estimation process therefore makes it possible to obtain in real time the trajectory or a portion of the trajectory of the means 155 for calculating the position of the device in addition to other variables considered secondary.

In some embodiments, each transmitter 140 of a surface transponder, 125, 130 or 135, acoustically transmits a linear combination of several periodic signals over several channels, with one channel for one pseudo-distance to be transmitted, each channel being either a clock signal over time from the geolocation system 200 or the representation of one of the radio pseudo-distances whose information is to be transmitted, each periodic signal being time-shifted as a function of the value of the radio pseudo-distance radio to be transmitted.

Thus, for example, if the transmitter 140 must transmit a signal representative of an estimated pseudo-distance, this transmitter 140 transmits acoustic signals at two frequencies: a first frequency corresponding to the clock signal of the geolocation system 200 and a second frequency corresponding to the pseudo-distance to be transmitted.

At this second frequency, a periodic signal is transmitted, continuously or during a defined time interval, and time-shifted as a function of the value of the estimated pseudo-distance. The offset function is, for example, linear, at a rate of one second for one unit of distance determined. For example, a distance of one hundred kilometers corresponds to a shift of one millisecond. Therefore, if an estimated pseudo-distance is equal to twenty thousand kilometers, the periodic signal is shifted by two hundred milliseconds.

If, for example, the transmitter 140 has to transmit two signals, each representative of an estimated pseudo-distance, three frequencies are utilized: the first corresponds to the clock signal, the second corresponds to a first pseudo-distance, and the third corresponds to a second pseudo-distance.

Therefore, as is understood, in these embodiments, the value of the pseudo-distances is not binarized then transmitted by the transmitter 140, instead it is transmitted indirectly by shifting the periodic signal. These embodiments make the transmission of the pseudo-distance values more robust.

In addition, the utilization of a plurality of frequencies enables a simultaneous and indirect transmission of the value of each pseudo-distance.

In these embodiments, the acoustic receiver 145 reconstitutes the information representative of the radio pseudo-distances, in comparison to the arrival times of the different acoustic signals over the different acoustic channels.

In some embodiments, at least one surface transponder 130 comprises at least two underwater acoustic transmitters 140.

In some embodiments, the system 100 that is the subject of the present invention comprises a structure 132 for attaching the at least two said underwater acoustic transmitters 140, the surface transponder 130 comprising a means 133 for determining the position of these underwater acoustic transmitters in the terrestrial frame relative to the receiver of signals transmitted by the satellite sources 165, 170 and 175, and a calculation means 134 implementing the following operations:

- a measurement of theoretical radio pseudo-distances simulating an identical position of the radio receiver 160 and underwater acoustic transmitters 140, and
- a transmission for commanding the transmission of the theoretical measurements of radio pseudo-distance values, by each transmitter 140.

This calculation means 134 is, for example, an electronic calculation circuit.

The calculation means 134 retrieves the radio pseudo-distance measurements from the radio receiver 160 and the respective directions of the sources, 165, 170 and/or 175 of the geolocation system 200 in a local reference frame (for example East/North/Higher). The calculation means is considered to be able to know the position of the underwater acoustic transmitters 140 relative to the radio receiver 160 in said local reference frame.

It is therefore possible to simulate what the measurement of the radio pseudo-distance would have been if the receiver 160 had been placed at the position of each transmitter 140. In effect, it is known that the radio pseudo-distance measurement is by definition the sum of, firstly, the time shift multiplied by the speed of light and, secondly, the distance separating the source, 165, 170 and/or 175 of the geolocation system 200 and the radio receiver 160. The time shift is considered constant during the simulation of the movement of the receiver 160. Therefore, to obtain the new radio pseudo-distance measurement, as if the radio receiver had been placed at the position of an acoustic transmitter 140, it will be necessary to add the pseudo-distance measurement, in meters, from the orthogonal projection distance of the position vector of the acoustic transmitter 140 projected onto the unit vector passing through the radio receiver 160 and the source 165, 170 and/or 175 of the geolocation system 200, in meters. This is our new virtual pseudo-distance measurement respecting the radio pseudo-distance measurement model.

In some embodiments, at least one surface transponder 125 comprises a means 186 for determining a position relative to the geolocation system 200, the transmitter 140 transmitting an item of information representative of the position determined to the underwater device, 105, 110, 115 and/or 120, the calculation means 155 of the underwater device being configured to calculate a position relative to the frame of reference of the geolocation system 200.

The determination means 186 is, for example, an electronic calculation circuit configured to probabilistically estimate the position of the transponder 125 from, as a minimum, a selection of information representative of the radio pseudo-distances estimated by the estimation means 180.

This determination means 186 is configured to, for example, perform a trilateration of the transponder 125 based on pseudo-distances estimated by the estimation means 180.

In some embodiments, the system 100 comprises at least two underwater devices, 105, 110, 115 and/or 120.

In some embodiments, at least one surface transponder, 125, 130 and/or 135, comprises a communication means 140 configured to receive, from at least one so-called "principal" underwater device 105, the position of one or more underwater devices and retransmit this information representative of the position of one or more underwater devices to at least one second underwater device, the so-called "principal" underwater devices being configured to transmit an item of information representative of the position of at least one underwater device to at least one surface transponder, 125, 130 and/or 135.

In some embodiments, at least one underwater device, 105, 110, 115 and/or 120, comprises a means 191 for communicating an item of information representative of the calculated position to at least a second so-called "principal" underwater device.

The communication means 191 is, for example, an antenna configured to transmit electromagnetic signals, or an electroacoustic transponder configured to transmit acoustic signals representative of electrical signals representative of the calculated position.

In some embodiments, at least one underwater device 105 comprises a means 195 for displaying an item of position information of at least one underwater device 110.

This display means 195 is, for example, a screen.

In some embodiments, the system 100 that is the subject of the present invention comprises a means 210, positioned above the surface, for displaying an item of information relative of the position of one or more underwater devices, 105, 110, 115 and/or 120.

This display means 210 is, for example, a screen of a computer, digital tablet or smartphone, for example.

In some embodiments, at least one underwater device 110 comprises at least one additional sensor 190 amongst:
- a depth sensor;
- an inertial measurement unit; and
- a magnetometer, the means 155 for calculating the position of the device comprising a computing unit executing a probabilistic estimation process performing this estimation by means of at least the following measurements:
- a selection of information representative of the radio pseudo-distances received by the reception means,
- a selection of acoustic pseudo-distances determined by the determination means, and
- a selection of measurements from at least one said additional sensor.

In some embodiments, at least one device 110 is embedded in a bracelet.

In some variants, at least one underwater device is embedded in a drone or in an underwater device.

Preferably, the system 100 that is the subject of the present invention comprises:
- at least three transponders, 125, 130 and 135, and a sensor 190, or
- at least four transponders, 125, 130 and 135.

Figure 2:
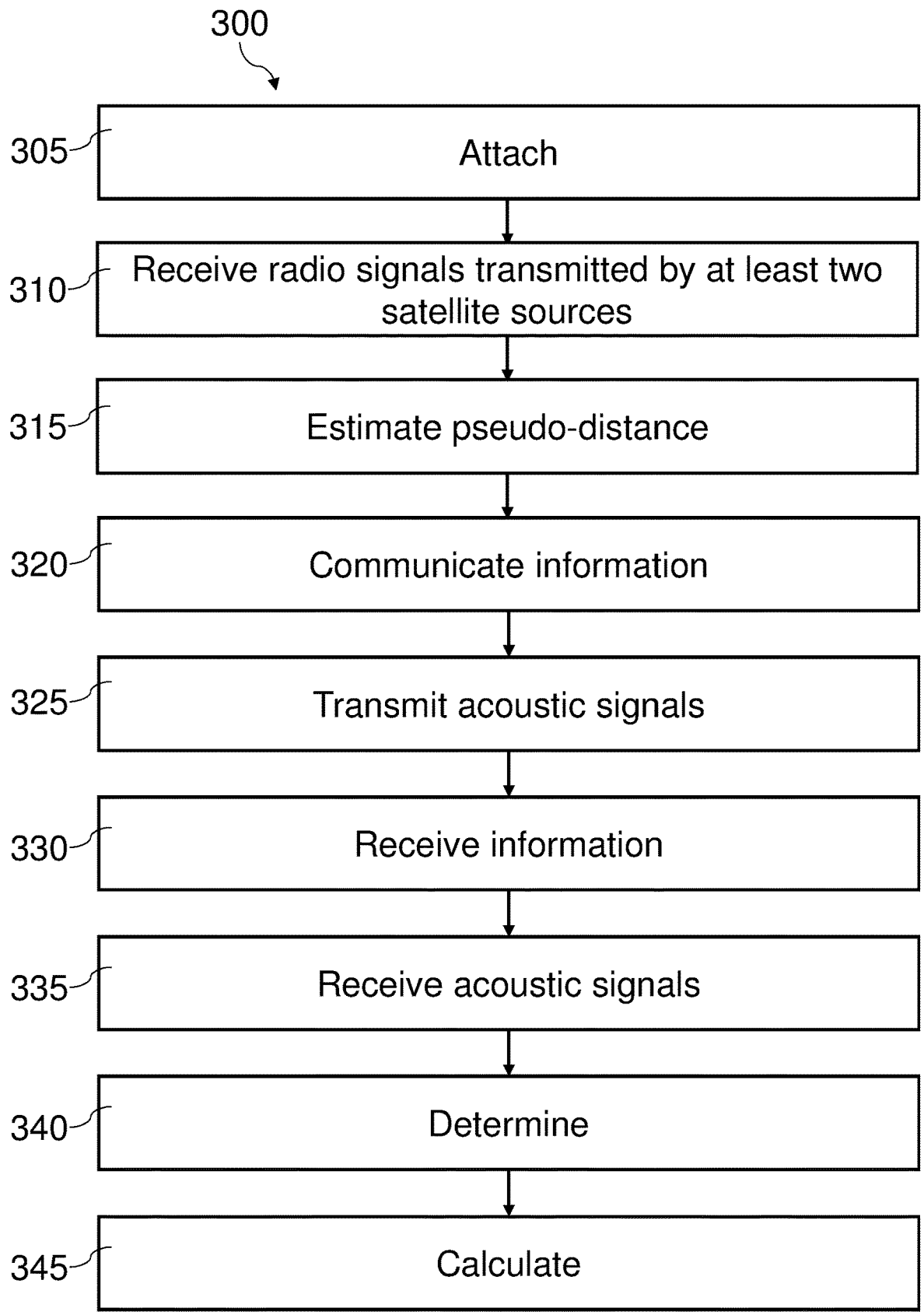
FIG. 2 represents, schematically and in the form of a logical diagram, a particular series of steps of the method that is the subject of the present invention.

FIG. 2 shows a particular embodiment of the method 300 that is the subject of the present invention. This method 300 of positioning an underwater device comprises:
- a step 305 of attaching a transponder to a float configured to have neutral buoyancy at a specific depth,
- a step 310 of receiving, by at least two surface transponders, radio signals transmitted by at least two satellite sources of signals of a geolocation system,
- a step 315 of estimating at least one radio pseudo-distance between the surface transponder and at least two sources of signals from the geolocation system,
- a step 320 of communicating, by a transponder, information representative of the radio pseudo-distances to the underwater device,
- a step 325 of underwater acoustic transmission, by a transponder, synchronized to the time of the geolocation system configured to transmit an acoustic signal to the underwater device,
- a step 330 of receiving information, by a reception means of the underwater device, representative of the radio pseudo-distances transmitted by at least two surface transponders,
- a step 335 of receiving, by a receiver of the underwater device, acoustic signals representative of the radio pseudo-distances transmitted by at least two surface transponders,
- a step 340 of determining one or more acoustic pseudo-distances between at least two underwater acoustic transmitters of surface transponders and the underwater device, and
- a step 345 of calculating the position of the device in a terrestrial frame of reference centered on one of the surface transponders, the means for calculating the position comprising a computing unit executing a probabilistic estimation process performing this estimation by means of at least the following measurements:
  - a selection of information representative of the radio pseudo-distances received by the reception means,
  - a selection of acoustic pseudo-distances determined by the determination means.

This method 300 is performed, for example, by utilizing the system 100 as described with regard to FIG. 1.

The invention claimed is:

1. System for positioning an underwater device, comprising:
   at least two surface transponders, each surface transponder comprising a receiver of radio signals transmitted by at least two satellite sources of signals of a geolocation system,
   each surface transponder comprising:
      an estimator for estimating at least one radio pseudo-distance between the surface transponder and at least two sources of signals from the geolocation system,
      an attachment to a float configured to have neutral buoyancy at a specific depth, and
      communicator for communicating information representative of the radio pseudo-distances to the underwater device, and
      an underwater acoustic transmitter synchronized to the time of the geolocation system configured to transmit an acoustic signal to the underwater device,
   the underwater device comprising:
      a receiver for receiving information representative of the radio pseudo-distances transmitted by at least two surface transponders,
      an acoustic signal receiver configured to receive the acoustic signals transmitted by at least two surface transponders,
      a determinator for determining one or more acoustic pseudo-distances between at least two underwater acoustic transmitters and the underwater device, and
      a calculator for calculating a position of the device in a terrestrial frame of reference centered on one of the surface transponders, the calculator comprising a computing unit executing a probabilistic estimation process performing this estimation by means of at least the following measurements:
         a selection of information representative of the radio pseudo-distances received by the receiver,
         a selection of acoustic pseudo-distances determined by the determinator.

2. System according to claim 1, wherein at least one underwater acoustic transmitter is synchronized to an internal clock of the radio receiver of the geolocation system.

3. System according to claim 1, wherein the acoustic transmitter and the communicator are one and the same, the acoustic transmitter communicating information representative of the radio pseudo-distances to the underwater device.

4. System according to claim 3, wherein the receiver and the acoustic signal receiver of an underwater device are one and the same, the receiver receiving information representative of the radio pseudo-distances transmitted by at least two surface transponders.

5. System according to claim 1, wherein:
each transmitter of a surface transponder acoustically transmits a linear combination of several periodic signals over several channels, with one channel for one pseudo-distance to be transmitted, each channel being either a clock signal over time from the geolocation system or the representation of one of the radio pseudo-distances whose information is to be transmitted, each periodic signal being time-shifted as a function of the value of the radio pseudo-distance radio to be transmitted, and
the acoustic signal receiver reconstitutes the information representative of the radio pseudo-distances, by comparing the arrival times of the different acoustic signals over the different acoustic channels.

6. System according to claim 1, wherein at least one surface transponder comprises at least two underwater acoustic transmitters.

7. System according to claim 6, which comprises a structure for attaching the at least two said underwater acoustic transmitters, the surface transponder comprising a determinator for determining the position of these underwater acoustic transmitters in the terrestrial frame relative to the receiver of signals transmitted by the satellite sources, and a calculator implementing the following operations:
a measurement of theoretical radio pseudo-distances simulating an identical position of the radio receiver and underwater acoustic transmitters, and
a transmission for commanding the transmission of the theoretical measurements of radio pseudo-distance values, by each transmitter.

8. System according to claim 1, wherein at least one surface transponder comprises a determinator for determining a position relative to the geolocation system, the transmitter transmitting an item of information representative of the determined position to the underwater device, the calculator of the underwater device being configured to calculate a position relative to the frame of reference of the geolocation system.

9. System according to claim 1, which comprises at least two underwater devices.

10. System according to claim 9, wherein at least one surface transponder comprises a communicator configured to receive, from at least one underwater device, known as "principal", the position of one or more underwater devices, and to retransmit this information representative of the position of one or more underwater devices to at least one second underwater device, the so-called "principal" underwater devices being configured to transmit an item of information representative of the position of at least one underwater device to at least one surface transponder.

11. System according to claim 10, wherein at least one underwater device comprises a communicator for communicating an item of information representative of the calculated position to at least a second so-called "principal" underwater device.

12. System according to claim 1, wherein at least one underwater device comprises a display for displaying an item of position information of at least one underwater device.

13. System according to claim 1, which comprises a display, positioned above the surface, for displaying an item of information relative of a position of one or more underwater devices.

14. System according to claim 1, wherein at least one underwater device comprises at least one additional sensor amongst:
a depth sensor;
an inertial measurement unit; and
a magnetometer,
the calculator for calculating a position of the device comprising a computing unit executing a probabilistic estimation process performing this estimation by means of at least the following measurements:
a selection of information representative of the radio pseudo-distances received by the receiver,
a selection of acoustic pseudo-distances determined by the determinator, and
a selection of measurements from at least one said additional sensor.

15. System according to claim 1, wherein at least one device is embedded in a bracelet.

16. Method of positioning an underwater device, comprising:
a step of attaching a transponder to a float configured to have neutral buoyancy at a specific depth,
a step of receiving, by at least two surface transponders, radio signals transmitted by at least two satellite sources of signals of a geolocation system,
a step of estimating at least one radio pseudo-distance between the surface transponder and at least two sources of signals from the geolocation system,
a step of communicating, by a transponder, information representative of the radio pseudo-distances to the underwater device,
a step of underwater acoustic transmission, by a transponder, synchronized to the time of the geolocation system configured to transmit an acoustic signal to the underwater device,
a step of receiving information, by a receiver of the underwater device, representative of the radio pseudo-distances transmitted by at least two surface transponders,
a step of receiving, by a receiver of the underwater device, acoustic signals representative of the radio pseudo-distances transmitted by at least two surface transponders,
a step of determining one or more acoustic pseudo-distances between at least two underwater acoustic transmitters of surface transponders and the underwater device, and
a step of calculating a position of the device in a terrestrial frame of reference centered on one of the surface transponders, the step of calculating the position comprising a computing unit executing a probabilistic estimation process performing this estimation by means of at least the following measurements:
a selection of information representative of the radio pseudo-distances received by the receiver,
a selection of acoustic pseudo-distances determined.

* * * * *